H. N. CHENEY & D. S. REYNOLDS.
GAS PURIFYING APPARATUS.
APPLICATION FILED FEB. 23, 1917.
1,261,767. Patented Apr. 9, 1918.
3 SHEETS—SHEET 1.
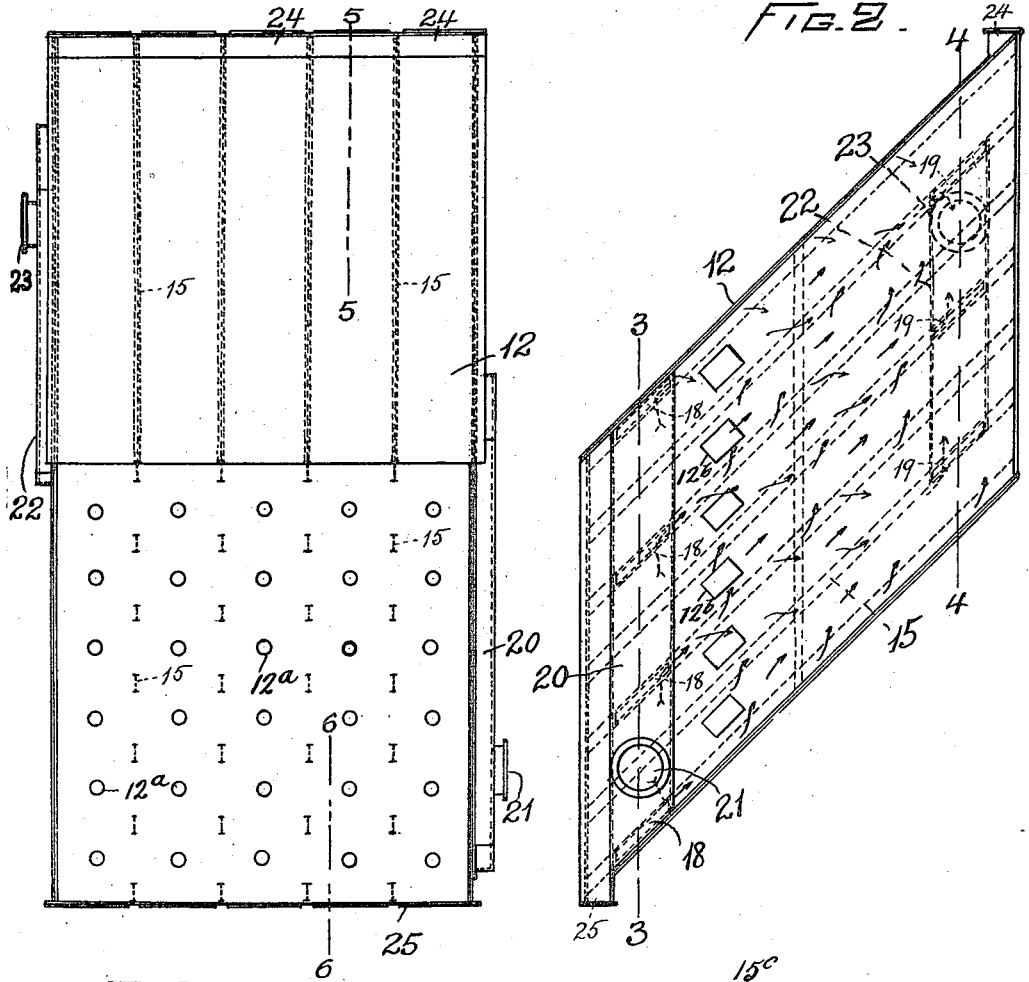
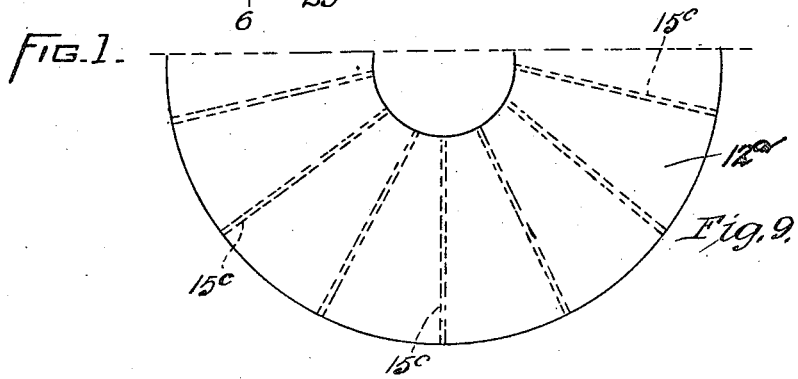
INVENTORS.
H. N. Cheney
D. S. Reynolds
by Knight Brown Quinby May
ATTY'S.

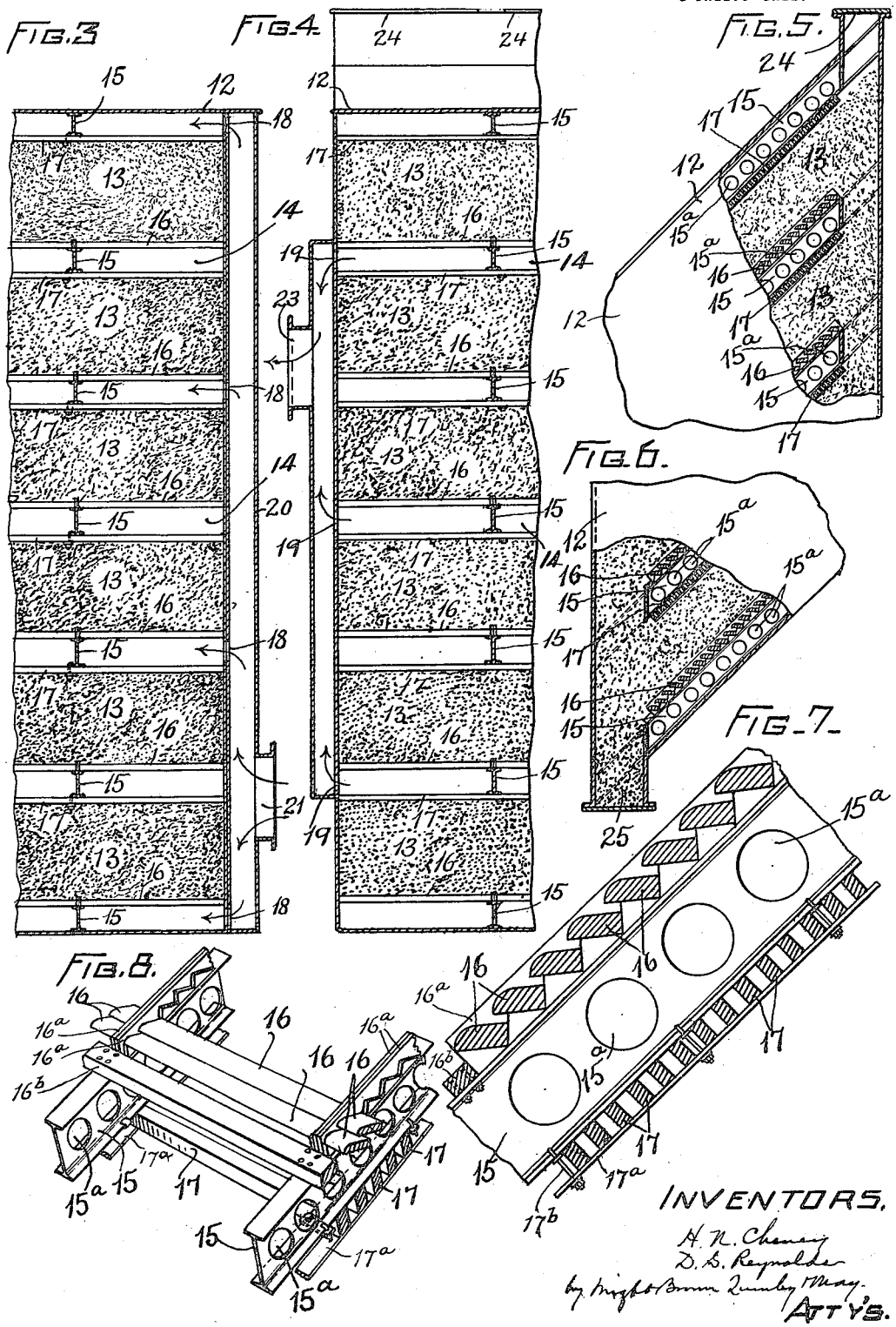

H. N. CHENEY & D. S. REYNOLDS.
GAS PURIFYING APPARATUS.
APPLICATION FILED FEB. 23, 1917.

1,261,767.

Patented Apr. 9, 1918.
3 SHEETS—SHEET 3.

Inventor
Herbert N. Cheney
David S. Reynolds
By Wright, Brown, Quinby & May
Attorney

UNITED STATES PATENT OFFICE.

HERBERT N. CHENEY, OF BOSTON, AND DAVID S. REYNOLDS, OF BROOKLINE, MASSACHUSETTS.

GAS-PURIFYING APPARATUS.

1,261,767.     Specification of Letters Patent.     Patented Apr. 9, 1918.

Application filed February 23, 1917. Serial No. 150,361.

*To all whom it may concern:*

Be it known that we, HERBERT N. CHENEY, residing at Boston, in the county of Suffolk, Commonwealth of Massachusetts, a citizen of the United States, and DAVID S. REYNOLDS, a subject of the King of Great Britain, residing at Brookline, in the county of Norfolk and State of Massachusetts, have invented new and useful Improvements in Gas-Purifying Apparatus, of which the following is a specification.

This invention relates to apparatus for removing gaseous impurities from illuminating and other gas, by the chemical action of a mass of purifying material, such as a spongy mass of rusted iron borings or filings, or a mass of lime, through which the gas is caused to flow, the purifying material being inclosed in a chamber having a suitable gas inlet and outlet, being inclined and adapted to be charged and emptied by a gravity flow of the purifying material.

The invention is embodied in certain improvements hereinafter described and claimed in gas-purifying apparatus having an inclined chamber or chambers adapted to be filled and emptied by gravity, said improvements being intended to provide for a free passage of gas to and from the purifying material to prevent leakage of the purifying material from the chamber to gas passages communicating therewith, and to enable the number of inlet and discharge ports and their closures to be reduced to the minimum.

Of the accompanying drawings, forming a part of this specification,—

Figure 1 is a front elevation of an apparatus embodying our invention.

Fig. 2 is a side elevation of the same.

Fig. 3 is a section on line 3—3 of Fig. 2.

Fig. 4 is a section on line 4—4 of Fig. 2.

Fig. 5 is a section on line 5—5 of Fig. 1.

Fig. 6 is a section on line 6—6 of Fig. 1.

Fig. 7 is an enlargement of a portion of either Fig. 5 or Fig. 6.

Fig. 8 is a fragmentary perspective view of the portion represented by Fig. 7.

Fig. 9 is a top plan view, showing half of a circular apparatus embodying the invention.

The same reference characters indicate the same or similar parts in all of the figures.

Figure 10:
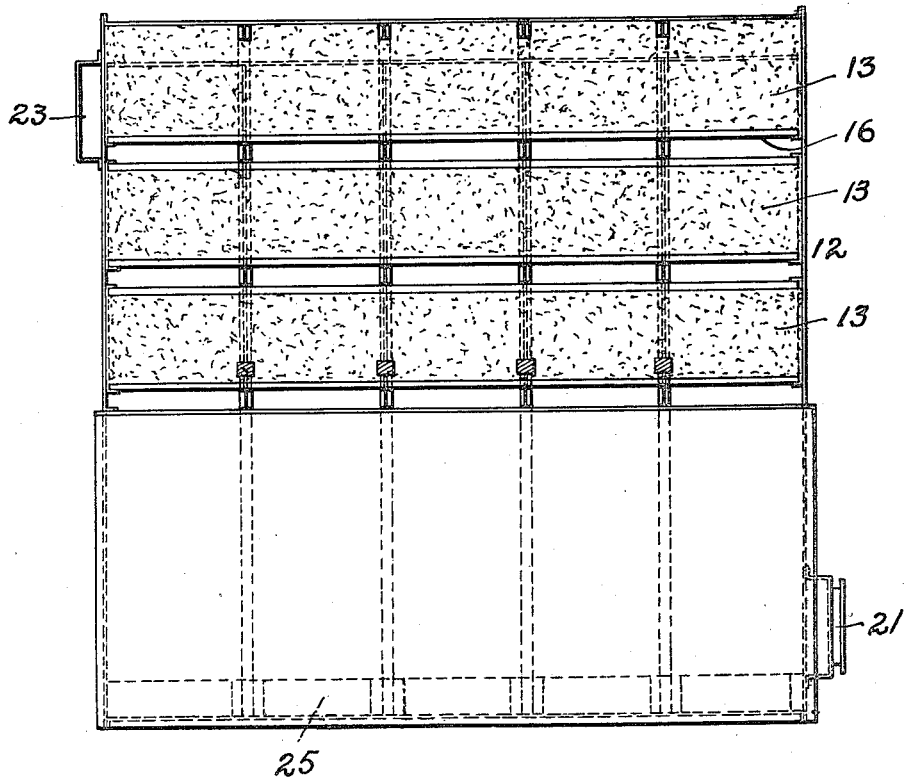
Fig. 10 is a transverse section taken near the upper end of Fig. 1.

Describing in detail the preferred embodiment of the invention shown by Figs. 1 to 8 of the drawings and by Fig. 10, 12 represents a box or casing having inclined top and bottom walls, substantially vertical side walls of rhomboidal form, and substantially vertical end walls, one of which is elevated above the other, as shown by Fig. 2.

The ends walls may be provided with hand holes $12^a$ (Fig. 1), and the side walls with man holes $12^b$ (Fig. 2), each of said holes having a suitable cover.

The casing is internally subdivided to form a series of inclined chambers, each adapted to contain a charge 13 of gas-purifying material.

The inclination of each chamber is such that purifying material introduced at its upper end will flow by gravity to its lower end and fill the chamber, and will also flow by gravity from the lower end to empty the chamber when the charge requires renewal.

The vertical walls of the inclined chambers are formed by vertical portions of the casing 12. The subdivision of the casing into inclined chambers is effected by suitably securing in the chamber a plurality of tiers of inclined beams 15, here shown as I-beams, although they may be otherwise formed, and grids coöperating with said beams and casing in such manner that the beams, casing and grids form gas-conducting and distributing passages 14 (Figs. 3, 4 and 10) adapted to conduct gas between each charge 13 and the next, the gas being allowed to percolate into all parts of the said charges.

Figs. 7 and 8 represent portions of a beam 15, and portions of the grids coöperating therewith. The upper grid shown by said figures is composed of a series of bars 16, located above and extending across the beam 15 and arranged in stepped formation, each bar being spaced from and somewhat overlapping the next bar below it, and the outer edges of the bars being preferably curved.

The grid formed by the bars 16 is adapted to support a charge 13 and prevent downward leakage of the charge into the gas passages 14 formed by the casing beams and grids. Said bars 16 are also adapted to guide the charge material when the same is flowing downwardly in the chamber of which said bars form the foraminous bottom.

The bars 16 have substantially horizontal bottom surfaces, the bottom surface of each bar, above the lowest, partially overhanging and being spaced from the upper surface of the adjacent lower bar. The rear portion of the top surface of each bar is substantially horizontal and its forward portion is inclined or curved downwardly to facilitate a gravity flow of the purifying material. The form and arrangement of the bars are such that gas is permitted to flow freely through the grid while leakage of the purifying material through the grid, into the gas passages below it, is prevented.

Located below and extending crosswise of the beams 15 is a grid which forms the foraminous top wall of a lower inclined chamber, and is adapted to define the top surface of a charge 13 in the last-mentioned chamber, and to permit the passage of gas into or from the space between the two grids, and prevent the upward passage of the purifying material into said space. To these ends the lower grid is composed of a series of bars 17 extending parallel with the bars 16 and preferably rectangular in cross section, said bars having opposite parallel faces forming the sides of gas passages communicating with the passages 14.

The beams 15 of the lower tier preferably bear directly on the lower inclined wall of the casing, the grid formed by the bars 17 being omitted. The beams 15 of the upper tier preferably bear on the upper inclined wall of the casing, the grid formed by the bars 16 being omitted. Each of the intermediate tiers of beams 15 is accompanied by two grids, as indicated by Figs. 7 and 8.

The beams 15 are preferably perforated at 15$^a$ to permit gas to flow through the beams.

The casing is provided with gas inlet ports 18 (Fig. 3) communicating with alternate tiers of gas passages, and with gas outlet ports 19 (Fig. 4), communicating with the remaining tiers of gas conduits. While the said inlet and outlet ports may be formed in one and the same side of the casing, we prefer to form the inlet ports in one side and the outlet ports in the opposite side, as shown. Gas is supplied to the inlet ports 18 through a trunk 20 provided with an inlet 21. Gas is conducted from the outlet ports 19 through a trunk 22 having an outlet 23.

The casing is provided with charge inlets 24 which are common to and communicate with the highest portions of all the inclined chambers, so that material inserted in said inlets fills all the chambers by gravity, and with charge outlets 25 which are common to and communicate with the lowest portions of all of the inclined chambers and provided with suitable removable closures. When the charge inlets are opened and the charge outlets closed, all the chambers may be charged by material inserted at said inlets. When said charge outlets are opened, all of the inclined chambers are emptied by gravity. The number of inlet and outlet ports and closures therefor is therefore reduced to the minimum.

It will now be seen that gas admitted at the inlet 21 is distributed and caused to flow through the charges 13 of purifying material, and is discharged after its passage through said charges at the outlet 23. It will also be seen that the grids formed by the bars 17 define the top sides of the charges 13, so that when the apparatus has received all the purifying material it can contain, there is no possibility of the formation of voids above the upper sides of the charges, or between said upper sides and the gas conduits above the charges, and no possibility of the purifying material flowing into the gas conduits. It will be seen, moreover, that the time and labor of charging and emptying the chambers is reduced to the minimum, and that in charging the apparatus the top surfaces of the charges are automatically defined.

The apparatus may be provided with any desired number of inclined chambers and intermediate gas-distributing conduits.

We do not limit the apparatus to the form herein described. It may be made in many different forms. For example, the casing may be circular, as indicated by Fig. 9, which shows a top plan view of one-half of a circular casing 12$^a$, and radially arranged beams 15$^c$ corresponding in function to the beams 15, said casing inclosing chambers which contain the purifying material and have foraminous top and bottom walls of frusto-conical shape, receiving the purifying material at the central upper portion of the casing and delivering said material at the lower outer portion of the casing.

The grid bars 16 are preferably made in sections, attached at their ends to strips 16$^a$ which may rest loosely on the beams 15, as shown by Figs. 7 and 8, the said sections and strips constituting removable trays. The lower ends of the strips 16$^a$ abut against chocks or bars 16$^b$ bolted to the beams. The said trays may be readily removed to permit access to the spaces between the bars 16 and 17. The bars 17 may be secured to the beams by clamping strips 17$^a$ bearing on the lower edges of the bars 17 and bolts 17$^b$ engaged with said strips and having hooked ends engaging the flanges of the beams.

It will be seen that the above-described grids are coextensive with the bottom and top surface areas of charges interposed between them, and that, as indicated by the arrows in Fig. 2, each grid is adapted to conduct gas uniformly to and from all portions of one of said areas, while preventing leakage of the charge material. The gas entering at the inlet ports 18 passes, as indicated by the arrows having dotted tail portions, into some of the gas conduits 14 formed by the beams and grids, and from thence through the grids into the surface areas of charges both below and above said conduits, and finally escapes through the outlet ports 19, as indicated by the arrows having dotted head portions, the intermediate arrows indicating paths taken by the gas between the inlet and outlet ports. The gas therefore has free access to and exit from the relatively large bottom and top surface areas of the charges and is circulated uniformly through all intermediate portions thereof.

We are aware that it has heretofore been proposed to provide inclined chambers in a gas purifier, adapted to be charged and emptied by a gravity flow of the purifying material, but in the only disclosure of such proposition of which we are aware, the top and bottom surfaces of the inclined charge have been in contact with imperforate walls forming the top and bottom of the chamber, the gas entering and leaving through grids arranged in vertical planes and forming the edge or upright walls of the chambers. The gas, therefore, is much less widely, freely and uniformly distributed than by our apparatus. It should be noted that in our apparatus the top and bottom grids present guiding surfaces which define and guide the top and bottom surfaces of the charge, and are free from projections tending to prevent the purifying material from completely filling the space between the grids. There are, therefore no voids or passages in the charge through which gas can pass without being purified.

The words "casing" and "chamber" used hereinbefore and in the appended claims, are not synonymous. The word "casing" applies to the inclosing structure 12 formed by the inclined top and bottom walls and the substantially vertical side and end walls. The word "chamber" applies to each of the inclined charge-containing subdivisions of the space inclosed by the casing, each chamber having an inclined foraminous bottom and an inclined foraminous top formed by the described grids. In the particular embodiment of the invention here shown, portions of the vertical walls of the casing form the vertical sides or walls of the chambers, the inclined top wall of the casing forms the top wall of the highest series of gas conduits, and the inclined bottom wall of the casing forms the bottom wall of the lowest series of gas conduits.

We claim:—

1. A gas-purifying apparatus, comprising an inclined chamber which includes an inclined grid adapted to support and permit a gravity flow of a charge of purifying material, and composed of stepped and spaced overlapping bars having substantially horizontal bottom surfaces, and top surfaces which are substantially horizontal at their rear portions and are inclined at their forward portions to facilitate said gravity flow, a portion of the bottom surface of each bar, above the lowest, overhanging the horizontal portion of the top surface of the adjacent lower bar to permit a flow of gas and prevent leakage of the purifying material through the grid, said grid forming the bottom of the chamber, an inclined foraminous chamber-top substantially parallel with said grid and defining the top surface of said charge, a charge inlet at the highest portion of the chamber, a charge outlet at the lowest portion of the chamber, and means for conducting gas to and from the chamber.

2. A gas-purifying apparatus, comprising an inclined chamber which includes an inclined grid adapted to support and permit a gravity flow of a charge of purifying material, said grid forming the bottom of the chamber, a tier of inclined spaced apart beams supporting said grid and extending crosswise of the bars thereof, said beams forming portions of inclined gas passages communicating with the chamber through the grid, the grid being composed of stepped and spaced overlapping bars having substantially horizontal bottom surfaces, the bottom surface of each bar, above the lowest, partially overhanging and being spaced from the top surface of the adjacent lower bar to permit a flow of gas and prevent leakage of the purifying material through the grid into said gas passages, an inclined foraminous chamber-top substantially parallel with said grid and defining the top surface of said charge, a charge inlet at the highest portion of the chamber, and a charge outlet at the lowest portion of the chamber.

3. A gas-purifying apparatus, comprising an inclosing casing, a plurality of inclined chambers arranged one above another, each chamber including an inclined charge-supporting and guiding lower grid and an inclined charge-top-defining upper grid, inclined gas passages communicating with the chambers through said grids, each lower grid being formed to permit the passage of gas and prevent the leakage of purifying material into gas passages below it, charge-admitting means common to and communicating with the upper ends of all the chambers, and charge-delivering means common to and communicating with the lower ends of all the chambers.

4. A gas-purifying apparatus, comprising a casing having inclined bottom and top walls, upright side walls, and upright end walls, a plurality of tiers of inclined beams located, one tier above another, in said casing, said beams being substantially parallel with said bottom and top walls, the beams of each tier being spaced apart to permit gas to flow between adjacent beams, a plurality of beam-supported inclined charge-supporting and guiding grids formed to permit the passage of gas and to prevent leakage of purifying material, a plurality of beam-supported charge-top-defining grids located above the charge-supporting grids, and formed to permit the passage of gas, said grids and the side walls of the casing forming inclined chambers adapted to receive and deliver charges of purifying material by gravity, the inclined bottom and top walls and the side walls of the casing coöperating with said grids in forming inclined gas passages communicating with said chambers through the grids, charge inlets common to and communicating with the highest portions of said chambers, charge outlets common to and communicating with the lowest portions of the chambers, and means for permitting gas to flow into and out of said passages.

In testimony whereof we have affixed our signatures.

HERBERT N. CHENEY.
DAVID S. REYNOLDS.